United States Patent [19]

Smethers, Jr.

[11] 4,040,334
[45] Aug. 9, 1977

[54] MISSILE LAUNCHER FOR AIRCRAFT

[75] Inventor: Rollo G. Smethers, Jr., Atlanta, Ga.

[73] Assignee: Lockheed Aircraft Corporation, Burbank, Calif.

[21] Appl. No.: 678,557

[22] Filed: Apr. 20, 1976

[51] Int. Cl.$^2$ .............................................. F41F 3/06
[52] U.S. Cl. .................................. 89/1.804; 89/1.818
[58] Field of Search ................. 89/1.801, 1.804, 1.818, 89/1.816, 1.817, 1.815, 1.8

[56] References Cited

U.S. PATENT DOCUMENTS

| | | | |
|---|---|---|---|
| 2,440,723 | 5/1948 | MacDonald | 89/1.804 |
| 2,802,398 | 8/1957 | Beach | 89/1.817 |
| 2,930,288 | 3/1960 | Jonah | 89/1.817 |
| 2,988,961 | 6/1961 | Berg | 89/1.801 |
| 3,084,600 | 4/1963 | Walker | 89/1.818 |
| 3,088,377 | 5/1963 | Siegel | 89/1.818 X |
| 3,583,277 | 6/1971 | Crocket | 89/1.818 X |

Primary Examiner—David H. Brown
Attorney, Agent, or Firm—Billy G. Corber; John J. Sullivan

[57] ABSTRACT

A mechanism rapidly and repetitively launches missiles from inside an aircraft during flight. One or more missiles are carried and launched through a tube protruding through the front of the aircraft thus obviating the necessity for bomb bay or other sizeable, open doors. The aircraft interior may be used as a large accumulator so that pressurized internal air is utilized as the propellant when admitted to a breech. Thus, a "cold" launch is achieved negating the possibility of a "hang fire". Multiple missiles can be carried in revolving chambers which are capable of rapid rotation into firing position. The advantages of the system include the ability to launch at high aircraft altitudes and speeds with the missile moving toward the target.

10 Claims, 7 Drawing Figures

MISSILE LAUNCHER FOR AIRCRAFT

This invention relates generally to missile launchers employed on aircraft and more particularly to an aircraft missile launcher designed and adapted to fire one or more internally carried missiles from the aircraft during flight with minimum adverse effect on the operation and movement of the aircraft and with maximum efficiency in missile separation and in launching it toward its target. While not necessarily limited to, the present missile launcher is especially useful in, launching relatively large (10,000 pounds and over) missiles of long range (on the order of 6,000 miles and up), such as for example the so-called ICBM (Intercontinental Ballistic Missile).

In the present state of the art launching of internally carried missiles from aircraft is accomplished from racks through typical bomb bays incorporated into the aircraft's fuselage. Alternatively, missiles are extracted from the aircraft through aft openings in the manner of aerially delivered cargo. In both of these methods, ignition of the missile's propellant occurs after dropping or extraction.

The principal objections to these prior missile launching methods resides in the impact on the aircraft and its operation at launch and immediately thereafter. Also, complications are involved in activating the missile after launch, directing it on target and satisfying its range requirements. For example, both the bomb bay and aft door extraction methods, requiring structural extentions from the aircraft, place severe restrictions on the allowable speed and altitude of the aircraft with a resulting limitation on missile range. Moreover, the timing of such launches is necessarily such that adverse ballast effects cause aircraft pitching.

The missile launcher herein proposed overcomes the foregoing and other objections and offers significant improvements particularly in the case of relatively large and long range missiles. Unlike existing launching systems the present invention contemplates a launcher which, among other things, is capable of firing missiles directly forward, i.e., in the direction of flight, out from the aircraft. This results in appreciably higher launch speeds with an increase in missile range.

At the same time this forward launcher eliminates most of the complications involved in righting and/or directing the missile after separation from the aircraft relative to the target. This includes a rapid fire capability which has also been recognized as desirable in many situations.

To the above ends the missile launcher of this invention is characterized by a revolver mechanism having a plurality a missile containing chambers mounted within the airplane and adapted to rotate to align one chamber at a time with a forward launch tube and an aft breech. With such an arrangement pressurized air within the fuselage may be ducted when desired to the breech in a controlled manner where it is releaseable on the rear of the missile in the aligned chamber to force it through the forward launch tube and out of the aircraft.

With the above and other objects in view as will be apparent this invention consists in the construction, combination and arrangement of parts all as hereinafter more fully described, claimed and illustrated in the accompanying drawings, wherein:

Figure 1:
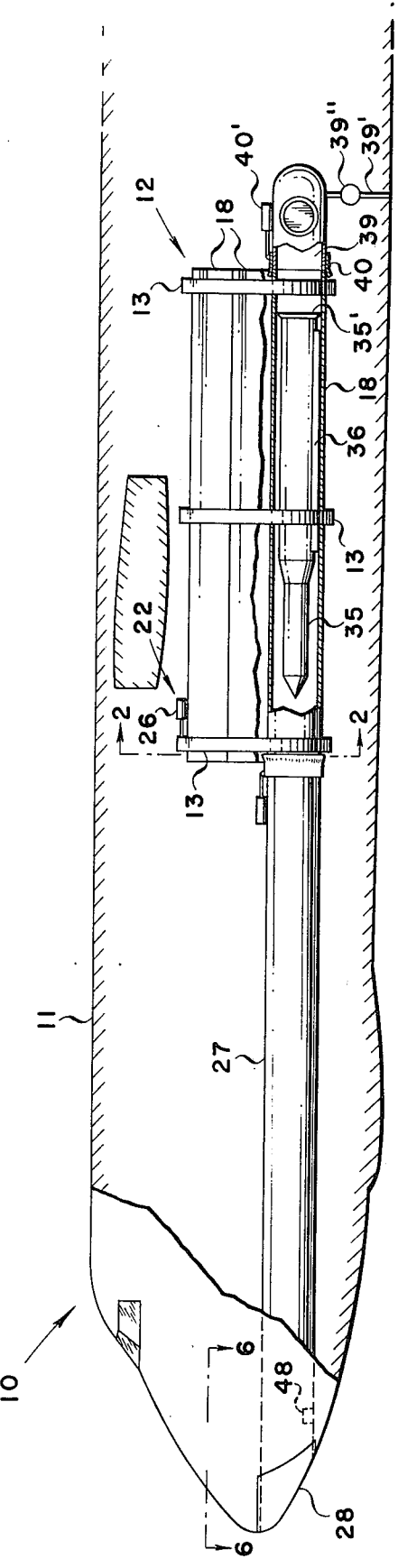
FIG. 1 is a longitudinal section taken through the major portion an airplane modified to incorporate a missile launcher within the purview of the present invention and showing primarily the general location and arrangement of the revolver mechanism within the fuselage with a missile containing chamber aligned with the forward launch tube and aft breech.

Referring more particularly to the drawings, 10 designates a typical airplane having a fuselage 11, the interior of which is pressurized and within the purview of this invention may be utilized as an accumulator, as will become more apparent. A revolver mechanism 12 is mounted within the fuselage 11 and is formed by a plurality of parallelly disposed, substantially identical, spaced rings 13 each stiffened by an internal web 14 and located about a common centerline 15. The several webs 14 are pierced by a number of aligned equally sized openings 16 defined by flanges 17 to act as bearing surfaces for substantially identical tubes 18 which pass therethrough and serve to connect the several rings 13 in unitary assembly.

The outer peripheral surfaces of the several rings 13 each abut complemental inner surfaces 19 of channeled supports secured to or otherwise carried by and projecting from brackets 20 on the adjacent walls of the fuselage 11. The arms 20' of the supports 20 enclose the sides of the associated rings 13 and may, if desired, include anti-friction means or rollers 21 for coaction with the side and end surfaces of the rings 13. Thus disposed, the revolver mechanism 12 is adapted to rotate freely about the centerline 15 while being secured against relative linear movement.

Rotation of the revolver 12 is accomplished by means of and through a drive mechanism generally indicated at 22. More specifically, one of the rings 13, for example the forwardmost ring 13 is formed or otherwise provided with gear teeth 23 on its inner surface designed and adapted to engage a pinion gear 24. The pinion gear 24 is at the end of a gear train 25 driven at its other end by a motor 26 mounted in any conventional manner on the adjacent fuselage structure.

Figure 6:
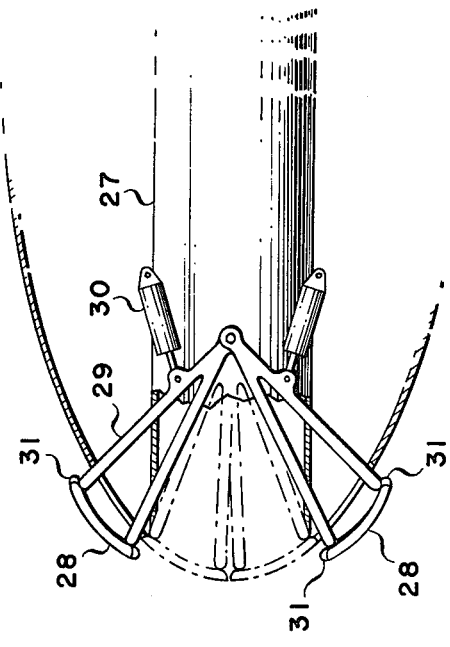
FIG. 6 is a longitudinal section through the forward end of the aircraft fuselage as indicated by line 6—6 of FIG. 1 and the launch tube to show the closure and its operating mechanism associated with the outlet opening therein.
Figure 2:
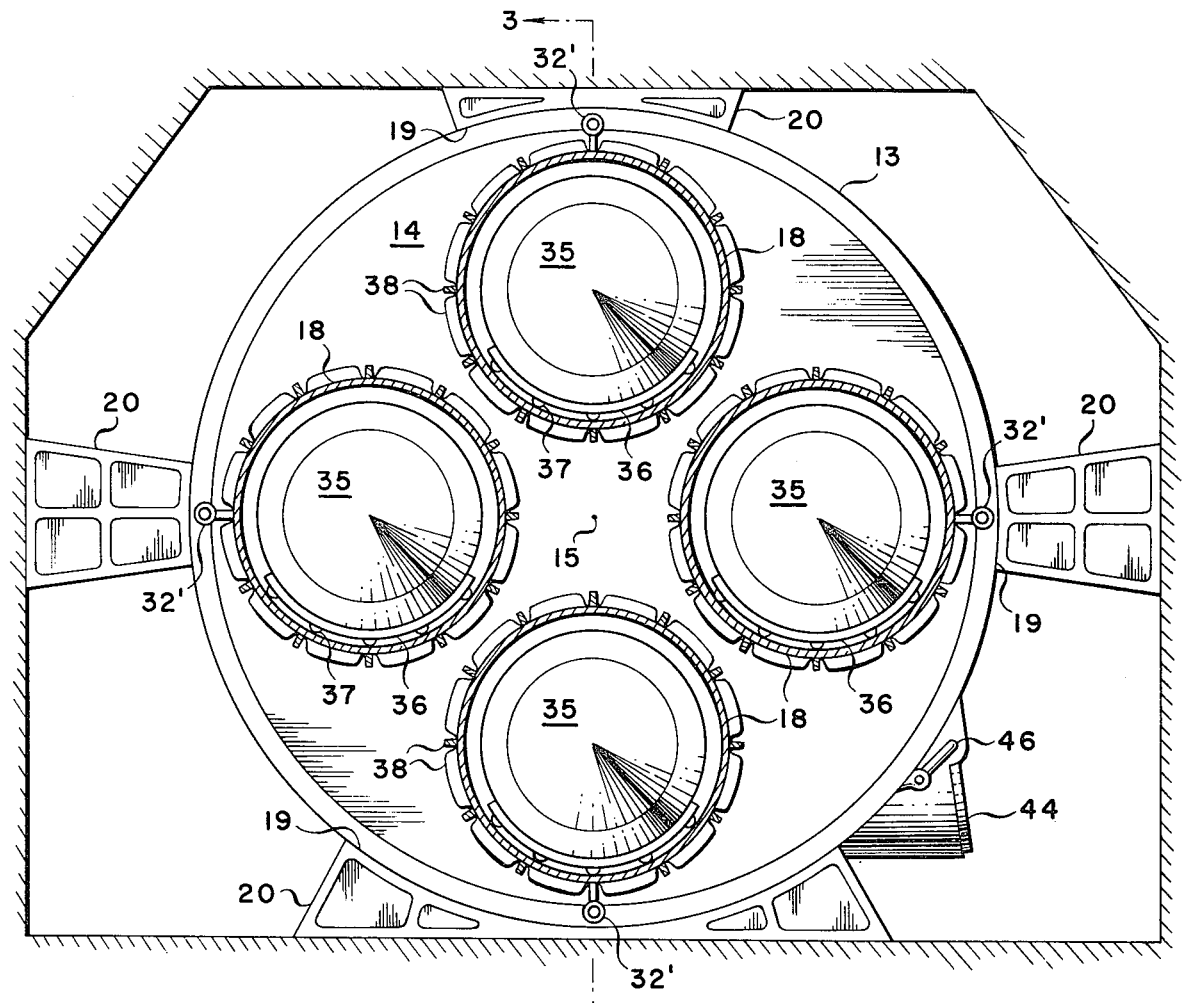
FIG. 2 is a transverse section taken along the line 2—2 of FIG. 1 to show the structural essentials of the revolver mechanism and its mounting and supporting details as well as those of the several chambers and the missiles within the several chambers.
Figure 5:
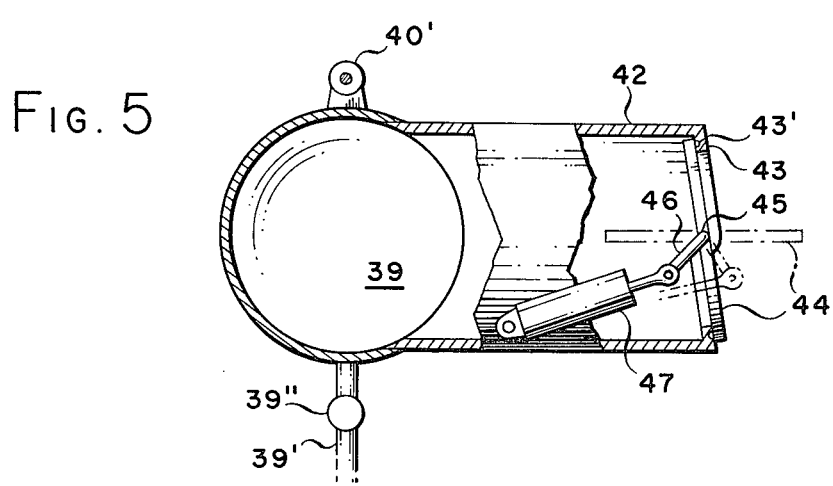
FIG. 5 is a section taken along line 5—5 of FIG. 4 to show primarily the control valve and its actuation mechanism.
Figure 3:
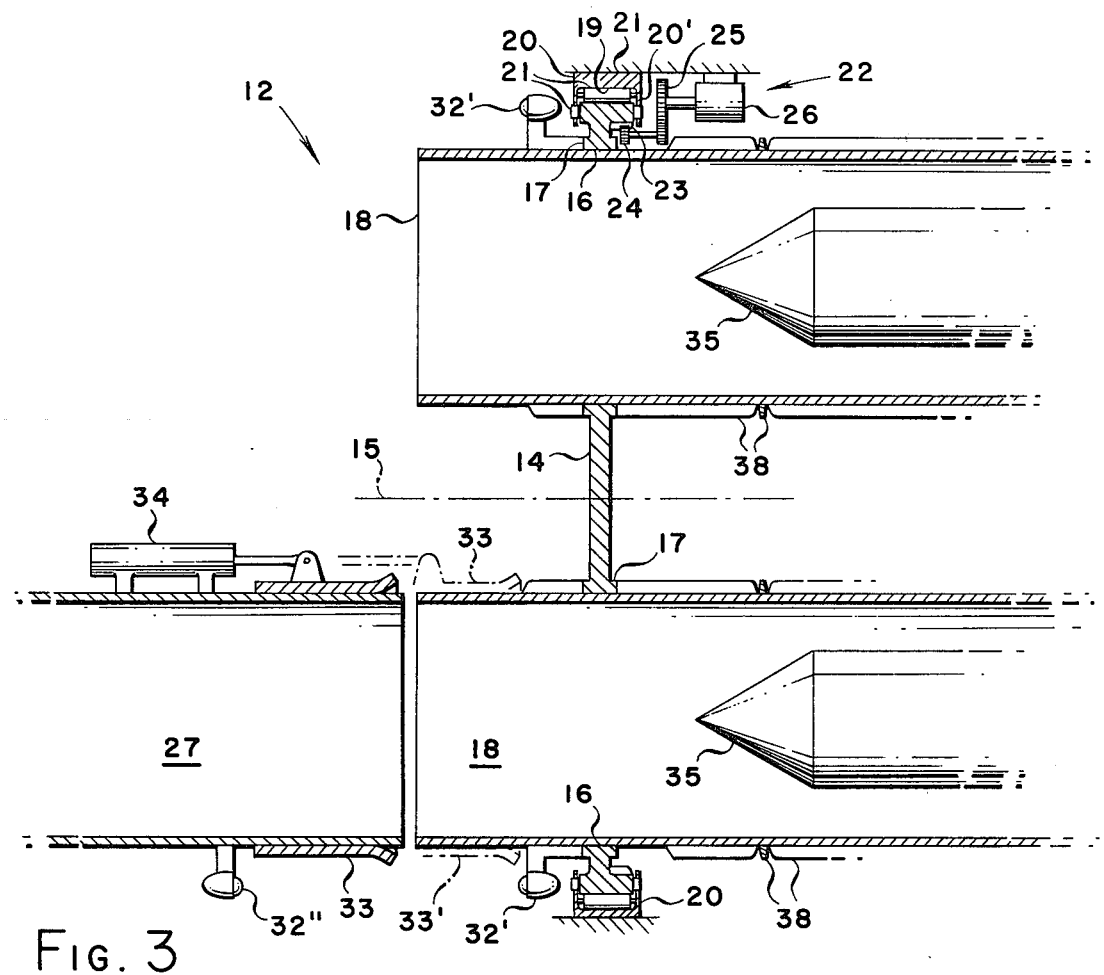
FIG. 3 is a section taken along line 3—3 of FIG. 2 to show primarily the drive for rotation of the revolver mechanism and the essentials of the alignment device for the forward launch tube and each missile containing chamber.
Figure 4:
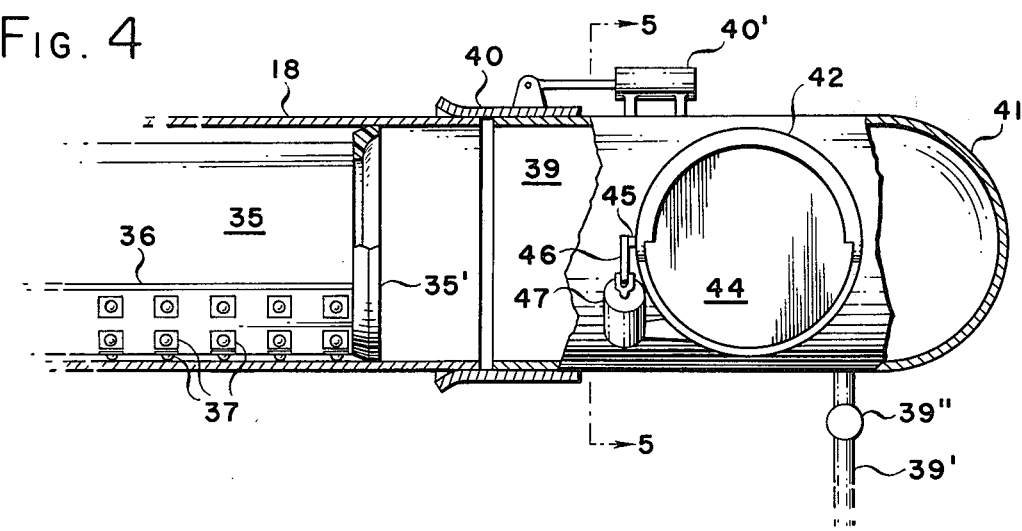
FIG. 4 is a longitudinal section through the breech and the aligned missile containing chamber to show primarily the valve to control the discharge of pressurized air from the fuselage interior onto and against the missile immediately prior to its launch.

Also mounted in the fuselage 11 immediately forward of the revolver 12 is a launch tube 27 which extends to and opens through the nose of the fuselage 11. Normally, the frontal opening of the tube 27 is closed by a door 28. Preferably, this door 28 is a two part closure which abuts at the longitudinal centerline of the fuselage 11 with each part actuated by linkage 29 driven by a power cylinder 30. The peripheral edges of the door 28 and the abutting edges of the door halves carry seals 31. As shown in FIG. 6 the door halves when open overlie the adjacent surface of the fuselage 11 being generally contoured to conform to shape thereto.

The launch tube 27 is substantially equal in transverse size and shape to each tube 18 and is so positioned in the fuselage 11 as to align with each tube 18 one at a time as the revolver 12 is axially adjusted, i.e., rotates. Such alignment is assured by suitable means such as an electric eye beam passed between each tube 18 and the launch tube 27. To this end emitter and receiver devices 32' and 32" are carried, the latter on the launch tube 27 and the former on the associated end of each tube 18. When each tube 18 is thus aligned with the launch tube 27 the adjacent ends thereof are enclosed by an overlying sleeve 33, the end of which may be flared, as at 33', to facilitate the sliding movement thereof over the tube end. Such sliding movement is controlled by an actuator 34 secured to the sleeve 33 at one end and to the launch tube 27 or other fixed fuselage structure at the other end. Thus disposed the sleeve 33 serves to retain the tubes 18 and 27 in longitudinal alignment and seal the interior thereof against communication with the pressurized interior of the fuselage 11.

Each tube 18 of the revolver mechanism 12 is adapted to receive and contain a missile 35 to be ejected therefrom through the launch tube 27 when aligned as above described. To facilitate this an intermediate agency in the form of a cradle 36 is employed in each tube 18 to minimize friction between the missile and tube surfaces. With the missile 35 resting in its cradle 36 conventional ball plates 37, i.e., free rolling balls mounted in plate retainers on the outer surface of the cradle 36, act on and against the adjacent tube wall when the missile 35 is ejected. If necessary or desired the several tubes 18 as well as the launch tube 27 may be structurally reinforced by a series of longitudinal and transverse or ring stiffeners 38. Also the base of each missile 35 carries an annular seal 35' which extends laterally outward beyond the periphery of the base for sliding contact on and against the inner wall of the tubes 18 and 27 during the ejection operation for reasons to become more apparent.

In order to effect each ejection of the several missiles 35 from the airplane through the launch tube 27 any auxiliary source of air, such as for example air obtained from a compressed air storage reservoir, may be employed. If is only necessary to provide sufficient thrust to propel the missile 35 forward of the airplane to a point where the missile's self-contained propellant is safely ignited. However, as indicated above according to the present invention such missile ejection is most effectively and efficiently accomplished by employing the airplane as an accumulator whereby pressurized air from the interior of the fuselage 11 is applied against the aft end of the missile 35 in the launch ready position.

It has been determined that the force P in pounds on the base of the missile is equal to the interior fuselage pressure p in pounds per square inch times the cross-sectional area A in square inches of the base of the missile 35, i.e.

$$P = pA$$

The force acting on the front of the missile 35 when the door 28 is open is the dynamic pressure $q$ of the air impacting the nose of the missile 35. This is:

$$q = (pV^2/2) A$$

Where $q$ is the pressure in pounds per square inch, $V$ is the aircraft's equivalent air speed in feet per second at launch attitude and $\rho$ is the air density in slugs per cubic feet.

An additional force acting on the missile 35 is caused by friction as the missile 35 slides along the tubes 18 and 27. The retarding frictional force $f$ is equal to the weight W of the missile 35 times the coefficient of friction $\mu$ i.e.

$$f = W\mu$$

Thus, the net expulsive or launch force F is:

$$F = P - q - W\mu$$

It is this net force which imparts an acceleration (and velocity) to the missile 35 relative to the carrying airplane.

As the missile 35 moves along the tubes 18 and 27 it is removing air from the interior of the fuselage 11 because the volume is increasing as fuselage air enters the exhausted portion of the tubes 18 and 27. According to Boyle's Law, the pressure-volume relationship is a constant, or PV = C. Therefore, at each point along the tubes 18 and 27 the pressure is reduced slightly. However, since the volume of the tubes 18 and 27 is considerably less (on the order of 2%) than the fuselage's volume, sufficient pressure always exists to continue the expulsion process.

In any event and regardless of the particular propellant employed pressure is directed against the base of the missile 35 from a chamber or breech 39 located immediately aft of the revolver mechanism 12 in axial alignment with the launch tube 27. Preferably the chamber 39 has a transverse dimension equal to that of the tubes 18 and 27 and includes a slidable sleeve 40 (moved by actuator 40') similar in all respects to the sleeve 33 above described for coaction with the adjacent end of the aligned tube 18. At its other end the chamber 39 is closed by an end wall 41 whereby the interior of the chamber 39 is isolated from the pressurized air within the fuselage 11.

In the preferred case where the force to be used for ejecting the missiles 35 is derived from the pressurized fuselage air, an intake nozzle is provided in the wall of the chamber or breech 39. This intake is formed by a laterally projecting neck 42 on the side wall of the breech 39 which is pierced by an opening for internal communication therewith and a quick acting valve operatively mounted in the outer end of the neck 42.

More specificaly the outer marginal end of the neck 42 is flanged inwardly as at 43 and includes a seal 43' to abut and act as an air tight closure for the marginal end of a damper valve 44. The damper valve 44 has an overall dimension substantially equal to the interior dimension of the neck 42 and includes a central pivot rod 45 secured to it and extending at one end through the neck wall where it engages a crank or arm 46. The other end of the arm 46 connects to the outer end of a power actuator 47 anchored at its other end to fixed fuselage structure. Thus, operation of the actuator 47 in conventional manner serves to rotate the damper 44 to and from extreme positions where it traverses and closes the opening in the neck 42 and extends parallelly along the axis of and opens the neck 42 to admit pressurized air to the breech 39 where it acts against the base of the missile 35.

The breech 39 is fitted with a vent 39' and a valve 39" to permit brief venting of the breech 39 to the atmosphere thus achieving an equalization of pressures ahead of and behind the missile 35 when forward doors 28 are opened to preclude movement of the missile 35.

A pressure sensitive device 48, such as for example an aneroid or diaphragm, is located at the very forward end of the launch tube 27. This device 48 detects the sudden loss of pressure as each missile 35 leaves the launch tube 27. The pressure change so detected is converted for example by transducers into an electrical signal which is transmitted to the breech 39 quick opening valve actuator 47 which moves to close the damper valve 44. This action permits restoration of internal airplane pressure for repetition of the launch cycle.

Figure 7:
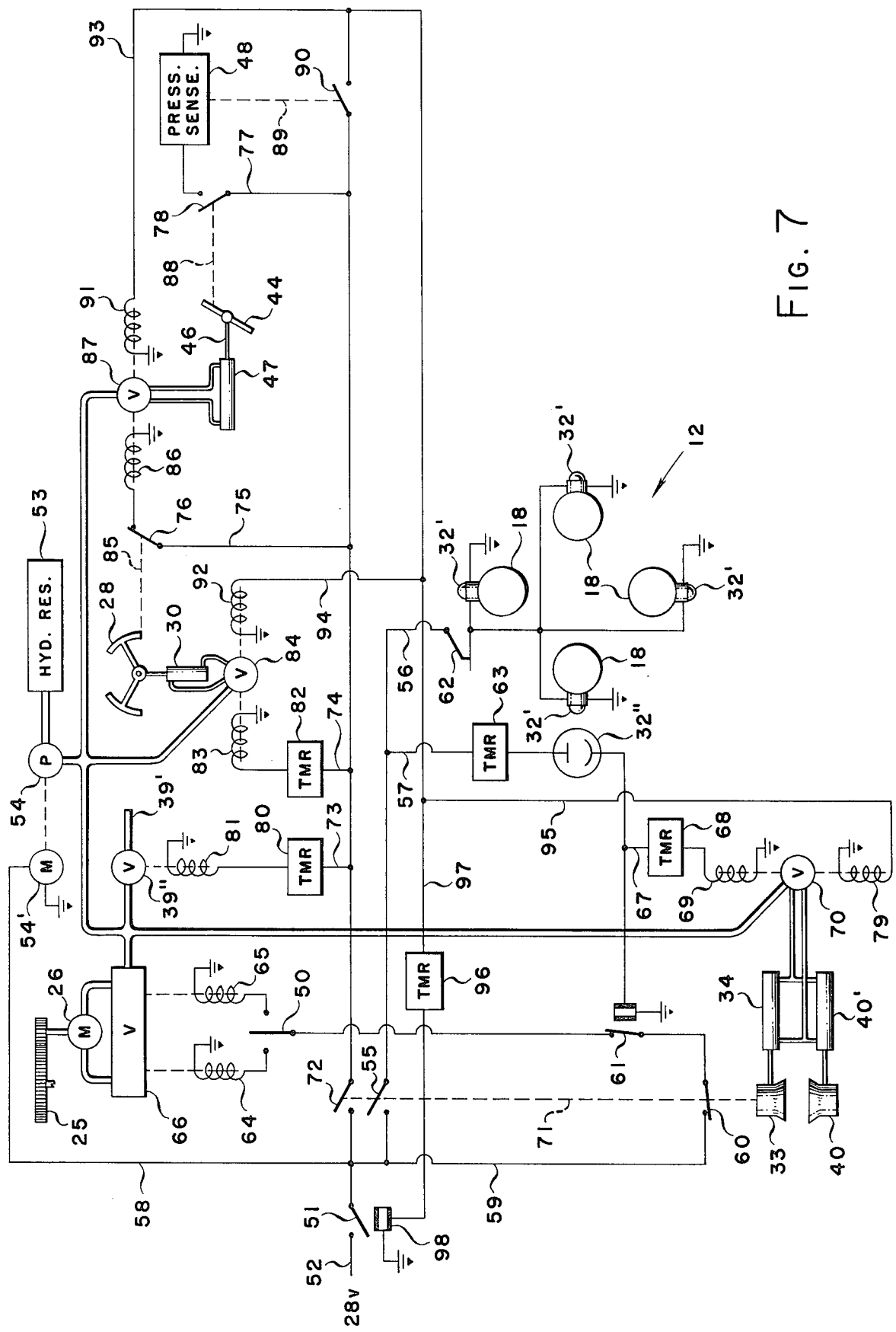
FIG. 7 is a schematic to show the operating system of the present launcher as depicted in FIGS. 1 through 6 for an understanding of the missile launch sequence.

Referring now specifically to FIG. 7, the launch sequence begins with an operator actuating a switch 50 to select either clockwise or counterclockwise rotation of the revolver mechanism 12. The operator then moves a relay switch 51 to the start position which initiates the launch of a missile 35 which proceeds automatically by electric and hydraulic means. Electricity is supplied from an onboard aircraft power source 52 and hydraulic pressure from a reservoir 53 is forced by an electrically driven hydraulic pump 54.

More specifically, upon actuation of the switch 51 current proceeds simultaneously through a normally closed switch 55 and through conductors 56 and 57 to the photoelectric alignment devices 32' and 32"; through a line 58 to an electric motor 54' which drives the hydraulic pump 54; and through a line 59 through a normally closed switch 60 and a closed relay switch 61 to initiate rotation of the revolver mechanism 12.

Current through the line 56 passes through a slip ring 62 to the emitter devices 32' on each missile tube 18. Current through the line 57 activates a timer 63 to provide a time delay in permitting activation of the receiver device 32" on the launch tube 27. This is necessary since a missile tube 18 is in alignment with the launch tube 27 upon closing of the switch 51 and the activation of the emitter devices 32' would cause the relay switch 61 to open preventing rotation of the revolver mechanism 12. The time delay permits rotation to begin causing the emitter 32' to pass out of alignment with receiver 32" on the launch tube 27.

With the switch 61 closed current proceeds through the line 59 to either one of the solenoids 64 or 65 depending on the setting of the switch 50 to open a hydraulic distributing valve 66 which causes the hydraulic motor 26 to turn the gears 24 and 25. Operation of the gears 24 and 25, in turn, cause the revolver mechanism 12 to rotate bringing the next loaded missile tube 18 into position. Upon alignment of the associated emitter 32' on the next tube 18 of revolver mechanism, with the receiver 32" carried by the launch tube 27, current is caused to flow so as to open the relay switch 61 which effectively stops the motor 26 and hence rotation of the revolver 12.

Simultaneously with the opening of the relay switch 61, current proceeds through the line 67 to a timer 68 causing a brief delay in the movement of the sleeves 33 and 40 to their closed position to ensure that the revolver 12 has stopped. Following the delay, current continues to a solenoid 69 for actuation of a hydraulic distributing valve 70 causing pressurized fluid from the reservoir 53 to flow to the sleeve actuators 34 and 40' which move the respective sleeves 33 and 40 to their closed position. This action seals the missile container tube 18 to the launch tube 27 and the breech 39.

Attainment of the closed position by sleeves 33 and 40 actuates a link 71 to close a switch 72 which permits current to simultaneously flow through a line 73 to the breech vent valve 39"; through a line 74 to the actuators 30 controlling the forward door 28; through a line 75 to a switch 76 for operation of the actuator 47 controlling the damper valve 44 to admit pressurized air (the propellant) into the breech 39; and through a line 77 to a switch 78 controlling the pressure sensor 48.

The closing of the sleeves 33 and 40 also opens the switches 60 and 55. Open switch 60 prevents the rotation of the revolver 12 while the sleeves 33 and 40 are in place. Open switch 55 deenergizes the circuit to the photoelectric devices 32' and 32" and therefore also to the solenoid 69. This results in the actuation of a solenoid 79 following launch of missile 35, permitting the sleeves 33 and 40 to be actuated to their open position disconnecting the tube 18 from the launch tube 27 and the breech chamber 39.

Current through the line 73 flows to a timer 80 which sequentially closes and then opens a solenoid 81 to operate the hydraulic valve 39" briefly venting the breech 39 to atmosphere through outlet 39'. Simultaneously, current through the line 74 activates a timer 82 which, in turn activates a solenoid 83 to open a hydraulic distributing valve 84 causing the hydraulic actuator 30 to open the forward launch doors 28 in the fuselage 11 exposing the missile launch tube 27 to atmosphere. The action of timers 80 and 82 are interrelated so that the opening of vent valve 39" is timed to occur simultaneously with the opening of doors 28. This action has the purpose of equalizing the pressure in the launch tube 27 and that portion of tube 18 in front of the missile 35 with the pressure behind the missile 35 in the breech 39 so as to prevent movement of the missile 35 in its tube 18 due to differential pressures.

Opening of the forward doors 28 through a link connection 85 actuates the switch 76 for operation of a solenoid 86 which opens a hydraulic distributing valve 87. The hydraulic actuator 47 thereby operates to rapidly open the breech valve 44. This action admits internal pressurized air to the breech 39 forcing missile 35 through the launch tube 27 and expulsion from airplane 10.

Upon opening, the breech valve 44 actuates, through a link connection 88, the pressure sensor 48 at the forward end of launch tube 27. This pressure sensor 48 detects the increase in pressure in the launch tube 27 behind the missile 35 caused by the pressurized fuselage 11 air just prior to separation of the missile 35 from the launch tube 27. The pressure change is converted by the sensor 48 into an electrical signal transmitted through a line 89 to actuate a switch 90 sequentially reversing several operations. Thus, the solenoids 91 and 92 are simultaneously actuated by a current flow in the respective lines 93 and 94 to close the breech valve 44 and forward doors 28 respectively. This activation of the switch 90 also serves to produce a current flow through a line 95 to the solenoid 79 causing the sleeves 33 and 40 to move to open the ends of the tube 18. At the same time a timer 96 is activated by current in the line 97 to delay opening of the relay 98 which opens switch 51 and sets the indicator thereof to "Ready" advising the operator that the sequence for launching of next missile 35 is ready to begin.

While the invention has been hereinabove illustrated and described in what is believed to be its best and most practical form under present-day conditions, it is recognized that under other conditions this form would be modified. No attempt has been made to specifically incorporate any of such other forms in this disclosure in the interest of clarity of the total inventive concept. The claims are relied upon to cover these other forms generally.

What is claimed is:

1. A missile launcher for aircraft comprising:
   at least one tube mounted internally of said aircraft and adapted to contain a missile to be ejected therefrom, each said missile tube being sized internally to the transverse dimension of the aft end of said missile and adapted to be disposed in axial alignment with an opening in the forward end of said aircraft;
   a removable and replaceable closure associated with said opening;
   a chamber at the aft end of said missile tube, the interior of which is in communication with the end of the adjacent missile tube aft of said missile therein;
   a source of fluid under pressure in excess of that in said each adjacent missile tube forwardly of said missile;
   a conduit connecting said chamber with said fluid source; and
   a valve associated with said conduit to control the passage of said fluid from said source into the adjacent chamber.

2. The missile launcher of claim 1 including a seal between the adjacent surfaces of each said missile and the associated missile tube to prevent the passage of fluid therethrough.

3. The missile launcher of claim 1 including anti-friction means between the adjacent surfaces of each said missile and the associated missile tube.

4. The missile launcher of claim 1 wherein said closure includes a pair of power-actuated, abutting halves, each defined by surfaces which are contoured to conform with the adjacent aircraft external surface, and a fluid tight seal operative between all of the edges of each of said halves and the adjacent aircraft edge defining said opening.

5. The missile launcher of claim 1 where said source of fluid under pressure is the pressurized air within the interior of the aircraft.

6. The missile launcher of claim 1 including a control mechanism interconnecting said closure and said valve for the sequential operation thereof whereby said closure is removed from said opening, said valve actuates first to admit fluid to its adjacent chamber and then to stop fluid passage to its adjacent chamber when said closure is replaced over said opening.

7. The missile launcher of claim 1 wherein a plurality of said missile tubes are secured in a revolver mechanism mounted for rotation about its own axis, and including a launch tube secured to said aircraft in a position between said revolver mechanism and the closure aforesaid, said launch tube being axially aligned with each said missile tube at a predetermined point in the rotation of said revolver mechanism, and engagement means operative to secure said launch tube to each said missile tube in the axially aligned position aforesaid.

8. The missile launcher of claim 7 wherein a single said chamber is secured to said aircraft and disposed in axial alignment with said launch tube, and including engagement means operative to secure each said missile tube in the axially aligned position aforesaid to said single chamber.

9. The missile launcher of claim 7 including a control mechanism interconnecting said revolver mechanism, said engagement means, said closure and said valve for the sequential operation thereof whereby said revolver mechanism is rotated to dispose a missile tube in the axially aligned position aforesaid, said engagement means secures said missile tube thus positioned, said closure is removed from said opening and said valve actuates to admit fluid to its adjacent chamber aforesaid.

10. The missile launcher of claim 9 including a device located adjacent the forward end of said launch tube and actuated by the passage of a missile therethrough, and a connection between said device and said control mechanism for the sequential operation thereof whereby said valve and said closure are closed, and said engagement means releases said missile tube.

* * * * *